(12) United States Patent
Kelley

(10) Patent No.: US 10,346,863 B2
(45) Date of Patent: Jul. 9, 2019

(54) SYSTEMS, COMPUTER-READABLE MEDIA, AND METHODS FOR ACTIVATION-BASED MARKETING

(75) Inventor: Jamie P. Kelley, Bloomington, MN (US)

(73) Assignee: UnitedHealth Group Incorporated, Minnetonka, MN (US)

( * ) Notice: Subject to any disclaimer, the term of this patent is extended or adjusted under 35 U.S.C. 154(b) by 467 days.

(21) Appl. No.: 12/686,924

(22) Filed: Jan. 13, 2010

(65) Prior Publication Data

US 2011/0173047 A1 Jul. 14, 2011

(51) Int. Cl.
*G06Q 10/00* (2012.01)
*G06Q 30/02* (2012.01)

(52) U.S. Cl.
CPC ......... *G06Q 30/0204* (2013.01); *G06Q 30/02* (2013.01); *G06Q 30/0211* (2013.01); *G06Q 30/0242* (2013.01); *G06Q 30/0254* (2013.01)

(58) Field of Classification Search
CPC ............... G06Q 30/02; G06Q 30/0211; G06Q 30/0204; G06Q 30/0242; G06Q 30/0224; G06Q 30/0254
See application file for complete search history.

(56) References Cited

U.S. PATENT DOCUMENTS

| | | | |
|---|---|---|---|
| 6,605,038 B1* | 8/2003 | Teller et al. | 600/300 |
| 2005/0222867 A1* | 10/2005 | Underwood et al. | 705/2 |
| 2006/0282317 A1* | 12/2006 | Rosenberg | 705/14 |
| 2007/0150350 A1 | 6/2007 | Libman | 705/300 |
| 2008/0065471 A1* | 3/2008 | Reynolds et al. | 705/10 |
| 2008/0249866 A1* | 10/2008 | Angell et al. | 705/14 |
| 2008/0249868 A1 | 10/2008 | Angell et al. | 705/14.53 |
| 2009/0271819 A1 | 10/2009 | Cansler et al. | 725/34 |
| 2009/0307002 A1* | 12/2009 | Costanzo et al. | 705/1 |
| 2009/0313076 A1* | 12/2009 | Schoenberg | G06F 19/327 705/2 |

(Continued)

OTHER PUBLICATIONS

Moon, Y. (2002). Personalization and Personality: Some Effects of Customizing Message Style Based on Consumer Personality. Journal of Consumer Psychology, 12(4), 313-325. (Year: 2002).*

(Continued)

*Primary Examiner* — William S Brockington, III
(74) *Attorney, Agent, or Firm* — Dorsey & Whitney LLP

(57) ABSTRACT

A system, computer program product, and method for activation-based marketing are presented. In one embodiment, the system includes one or more data storage devices configured to store demographic data, healthcare utilization data, and response data associated with a target individual. The system may include a server coupled to the one or more data storage devices. The server may be suitably programmed to determine a life stage associated with a target individual, determine an attitudinal segment associated with the target individual, and determine a response model associated with the target individual. The server may assign the target individual to at least one of a predetermined set of segmentation groups in response to the life stage, the attitudinal segment, and the response model associated with the individual. The system may generate a personalized communication modality tailored to the target individual in response to the segmentation group assigned to the target individual.

11 Claims, 11 Drawing Sheets

(56) References Cited

U.S. PATENT DOCUMENTS

2010/0082801 A1* 4/2010 Patel ................... G06F 15/16
                                                                709/224

OTHER PUBLICATIONS

PCT International Preliminary Report on Patentability issued in International Patent Application No. PCT/US2010/020918, dated Jul. 17, 2012.

* cited by examiner

1000

| Member Info | Perscribing Providers | Medications | Contacts | Notes | | 1002 |

JOE LAMB [111671351]

| | | | | Cohort: | System Exp |
| --- | --- | --- | --- | --- | --- |
| DOB: | 7/15/1953 | Referral Source: | PREDICTIVE MODEL | Ethnicity: | Caucasian |
| Program: | Healthy Back | Restricted member: | NO | Index: | 52 |

| | Opp. Date | Opportunity Name | Status | Points |
|---|---|---|---|---|
| | | RIGHT PROVIDER | | |
| edit | 1/21/2008 | A. Premium Back PCP Referral | Identified - 1/21/2008 | 300 |
| edit | 1/21/2008 | B. Tier 1 Chiro/PT Referral | Open | 300 |
| edit | 1/21/2008 | C. OON to INN Back Provider Referral | Open | 100 |
| edit | 1/21/2008 | D. Behavioral Health/EAP Referral | Open | 50 |
| edit | 1/21/2008 | E. Q&E Back Specialist Referral | Open | 300 |
| | | RIGHT MEDICATION | | |
| edit | 1/21/2008 | Shift from Injections | Open | 200 |
| | | RIGHT CARE | | |
| edit | 1/21/2008 | Back Pain Flare-up Plan | Open | 150 |
| edit | 1/21/2008 | Behavioral Health Screen | Identified - 1/21/2008 | 100 |
| edit | 1/21/2008 | Healthy Back Online Education | Identified - 1/21/2008 | 50 |
| edit | 2/5/2008 | Healthy Weight Online Education | Open | 50 |

FIG. 10

SYSTEMS, COMPUTER-READABLE MEDIA, AND METHODS FOR ACTIVATION-BASED MARKETING

BACKGROUND OF THE INVENTION

Field of the Invention

This invention relates to marketing and more particularly relates to systems, computer-readable media, and methods for activation-based marketing.

Description of the Related Art

In general, marketing costs can be a substantial portion of the overall cost of launching a new product, service, or program. Indeed, marketing costs can often far exceed development costs associated with a new product, service, or program. Nonetheless, marketing is typically an essential element of, e.g., product launches. This is typically due to a correlation between demand for the product and public awareness of the existence of the product.

Certain more sophisticated marketing techniques may include targeted marketing campaigns. For example, a company may target a particular demographic segment of society with a television or radio advertisement. In these situations, the advertisement may include actors that are the same age, gender, or ethnicity as individuals in the target demographic segment.

Unfortunately, only general information about the target demographic segment as a whole is typically available. For example, a hypothetical company may have information through surveys, or other information sources indicating that Asian men over the age of 40 are most likely to purchase their products. In this example, the hypothetical company may chose to focus their marketing investment on creating advertisements that are most likely to appeal to people of that demographic segment. Alternatively, the company may chose to expand their market by targeting another demographic segment. In either approach, it is clear that only limited demographic information is available to help guide the marketing campaign.

The referenced shortcomings are not intended to be exhaustive, but rather are among many that tend to impair the effectiveness of previously known techniques in marketing; however, those mentioned here are sufficient to demonstrate that the methodologies appearing in the art have not been satisfactory and that a significant need exists for the techniques described and claimed in this disclosure.

SUMMARY OF THE INVENTION

From the foregoing discussion, it should be apparent that a need exists for systems, computer-readable media, and methods for activation-based marketing.

In A method for activation-based marketing is presented. In one embodiment, the method includes generating a personalized action plan corresponding to a customer, where the personalized action plan is generated based upon customer information comprising: a consumer activation index of the customer, and demographic information about the customer.

In a further embodiment, the personalized action plan may be generated based further upon a health index of the customer. In still a further embodiment, generating a personalized action plan may include determining customer information. The customer information may include a consumer activation index of the customer, a health index of the customer, life stage information of the customer, an attitudinal model corresponding to the customer. Generating the personalized action plan may further include applying to the customer information a response model corresponding to the customer, applying to the customer information a segmentation model corresponding to the customer, and applying to the customer information a consumer model corresponding to the customer.

In one embodiment, a method for activation-based marketing may include determining a life stage associated with a target individual. The method may also include determining an attitudinal segment associated with the target individual. Additionally, the method may include determining a response model associated with the target individual. In still a further embodiment, the method may include assigning the target individual to at least one of a predetermined set of segmentation groups in response to the life stage, the attitudinal segment, and the response model associated with the individual. The method may also include generating a personalized communication modality tailored to the target individual in response to the segmentation group assigned to the target individual.

In a further embodiment, generating the personalized communication modality may include generating customized message content for a communication to the target individual in response to the segmentation group assigned to the target individual, generating a tonal guideline for a communication to the target individual in response to the segmentation group assigned to the target individual, and determining a communication medium for conveying the communication to the target individual in response to the segmentation group assigned to the target individual.

A computer program product for activation-based marketing is also presented. In one embodiment, the computer program product includes a tangible computer-readable medium comprising executable instructions. The instructions may include generating a personalized action plan corresponding to a customer, where the personalized action plan is generated from customer information. The customer information may include a consumer activation index of the customer, a health index of the customer, and demographic information about the customer.

In a further embodiment, the personalized action plan may also be generated from attitudinal information about the customer. In another embodiment, the personalized action plan is also generated from responsiveness information about the customer. Additionally, the personalized action plan may also be generated from attitudinal information about the customer. Further, the personalized action plan may include benefit offers, incentive offers, policy enhancements, care enhancements, coaching enhancements, or communication enhancements.

In one embodiment the instructions for generating a personalized action plan include selecting two or more predefined action items corresponding to the customer information from one or more databases storing a plurality of predefined action items. Additionally, the instruction may include outputting at least a portion of the action plan for the customer. In such an embodiment, the portion of the action plan is output responsive to a communication link being established with the customer, and where the output portion corresponds to the type of communication link established.

A system for activation-based marketing is also presented. In one embodiment, the system includes one or more data storage devices configured to store demographic data, healthcare utilization data, and response data associated with a target individual. Additionally, the system may include a server coupled to the one or more data storage devices. The server may be suitably programmed to determine a life stage associated with a target individual, determine an attitudinal segment associated with the target individual, and determine a response model associated with the target individual. Additionally, the server may assign the target individual to at least one of a predetermined set of segmentation groups in response to the life stage, the attitudinal segment, and the response model associated with the individual. In a further embodiment, the system may generate a personalized communication modality tailored to the target individual in response to the segmentation group assigned to the target individual.

In one embodiment, the system also includes a display device coupled to the server, the display device configured to display the personalized communication modality to a user. Additionally, the system may include a user interface device coupled to the server, the user interface device configured to display the personalized communication modality to a user.

Other features and associated advantages will become apparent with reference to the following detailed description of specific embodiments in connection with the accompanying drawings.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

FIG. 10 is screen-shot diagram illustrating one embodiment of a display for activation-based marketing;

DETAILED DESCRIPTION

Figure 1:
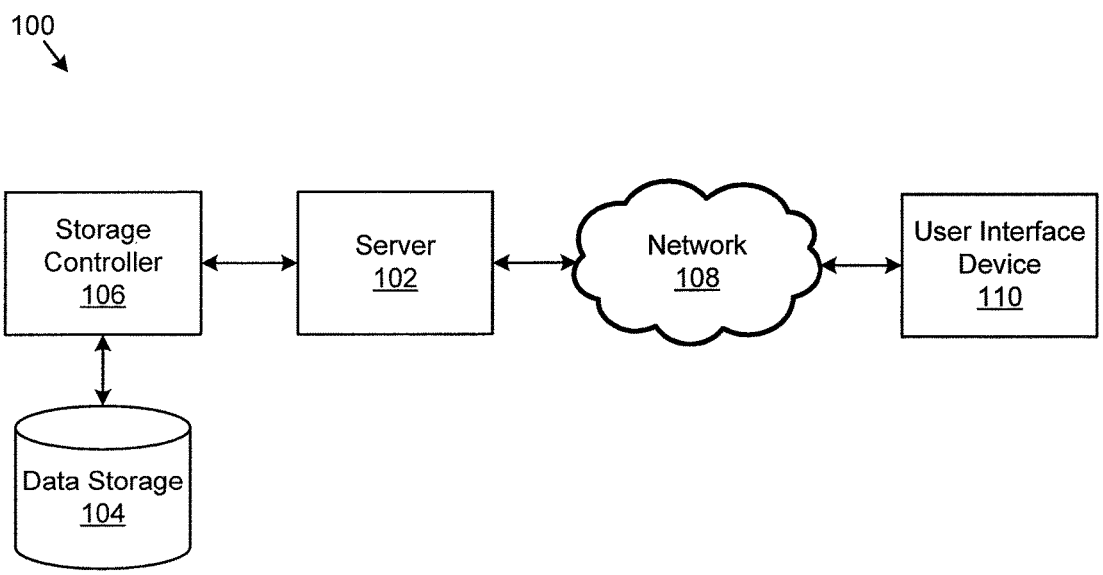
FIG. 1 is a schematic block diagram illustrating one embodiment of a system for activation-based marketing.

The term "coupled" is defined as connected, although not necessarily directly, and not necessarily mechanically.

The terms "a" and "an" are defined as one or more unless this disclosure explicitly requires otherwise.

The term "substantially" and its variations are defined as being largely but not necessarily wholly what is specified as understood by one of ordinary skill in the art, and in one non-limiting embodiment "substantially" refers to ranges within 10%, preferably within 5%, more preferably within 1%, and most preferably within 0.5% of what is specified.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a method or device that "comprises," "has," "includes" or "contains" one or more steps or elements possesses those one or more steps or elements, but is not limited to possessing only those one or more elements. Likewise, a step of a method or an element of a device that "comprises," "has," "includes" or "contains" one or more features possesses those one or more features, but is not limited to possessing only those one or more features. Furthermore, a device or structure that is configured in a certain way is configured in at least that way, but may also be configured in ways that are not listed.

Various features and advantageous details are explained more fully with reference to the nonlimiting embodiments that are illustrated in the accompanying drawings and detailed in the following description. Descriptions of well known starting materials, processing techniques, components, and equipment are omitted so as not to unnecessarily obscure the invention in detail. It should be understood, however, that the detailed description and the specific examples, while indicating embodiments of the invention, are given by way of illustration only, and not by way of limitation. Various substitutions, modifications, additions, and/or rearrangements within the spirit and/or scope of the underlying inventive concept will become apparent to those skilled in the art from this disclosure.

Certain units described in this specification have been labeled as modules, in order to more particularly emphasize their implementation independence. A module is "[a] self-contained hardware or software component that interacts with a larger system." Alan Freedman, "The Computer Glossary" 268 (8th ed. 1998). A module comprises a machine or machines executable instructions. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also include software-defined units or instructions, that when executed by a processing machine or device, transform data stored on a data storage device from a first state to a second state. An identified module of executable code may, for instance, comprise one or more physical or logical blocks of computer instructions which may be organized as an object, procedure, or function. Nevertheless, the executables of an identified module need not be physically located together, but may comprise disparate instructions stored in different locations which, when joined logically together, comprise the module, and when executed by the processor, achieve the stated data transformation.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices.

In the following description, numerous specific details are provided, such as examples of programming, software modules, user selections, network transactions, database queries, database structures, hardware modules, hardware circuits, hardware chips, etc., to provide a thorough understanding of the present embodiments. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

FIG. 1 illustrates one embodiment of a system 100 for activation-based marketing. The system 100 may include a server 102, a data storage device 104, a network 108, and a user interface device 110. In a further embodiment, the system 100 may include a storage controller 106, or storage server configured to manage data communications between the data storage device 104, and the server 102 or other components in communication with the network 108. In an alternative embodiment, the storage controller 106 may be coupled to the network 108.

In a general embodiment, the system 100 may generate a personalized action plan corresponding to a customer, where the personalized action plan is generated based upon customer information comprising: a consumer activation index of the customer, and demographic information about the customer. Specifically, the system 100 may determine a life stage associated with a target individual, determine an attitudinal segment associated with the target individual, determine a response model associated with the target individual, assign the target individual to at least one of a predetermined set of segmentation groups in response to the life stage, the attitudinal segment, and the response model associated with the individual, and generate a personalized communication modality tailored to the target individual in response to the segmentation group assigned to the target individual.

In one embodiment, the user interface device 110 is referred to broadly and is intended to encompass a suitable processor-based device such as a desktop computer, a laptop computer, a Personal Digital Assistant (PDA), a mobile communication device or organizer device having access to the network 108. In a further embodiment, the user interface device 110 may access the Internet to access a web application or web service hosted by the server 102 and provide a user interface for enabling a user to enter or receive information. For example, the user may enter an identifier of a product, service, or program to be marketed. Alternatively, the user may enter an identifier of an individual to be contacted for marketing purposes.

The network 108 may facilitate communications of data between the server 102 and the user interface device 110. The network 108 may include any type of communications network including, but not limited to, a direct PC to PC connection, a local area network (LAN), a wide area network (WAN), a modem to modem connection, the Internet, a combination of the above, or any other communications network now known or later developed within the networking arts which permits two or more computers to communicate, one with another.

In one embodiment, the server 102 is configured to determine a life stage associated with a target individual, determine an attitudinal segment associated with the target individual, determine a response model associated with the target individual, assign the target individual to at least one of a predetermined set of segmentation groups in response to the life stage, the attitudinal segment, and the response model associated with the individual, and generate a personalized communication modality tailored to the target individual in response to the segmentation group assigned to the target individual. Additionally, the server may access data stored in the data storage device 104 via a Storage Area Network (SAN) connection, a LAN, a data bus, or the like.

The data storage device 104 may include a hard disk, including hard disks arranged in an Redundant Array of Independent Disks (RAID) array, a tape storage drive comprising a magnetic tape data storage device, an optical storage device, or the like. In one embodiment, the data storage device 104 may store health related data, such as insurance claims data, consumer data, or the like. The data may be arranged in a database and accessible through Structured Query Language (SQL) queries, or other data base query languages or operations.

Figure 2:
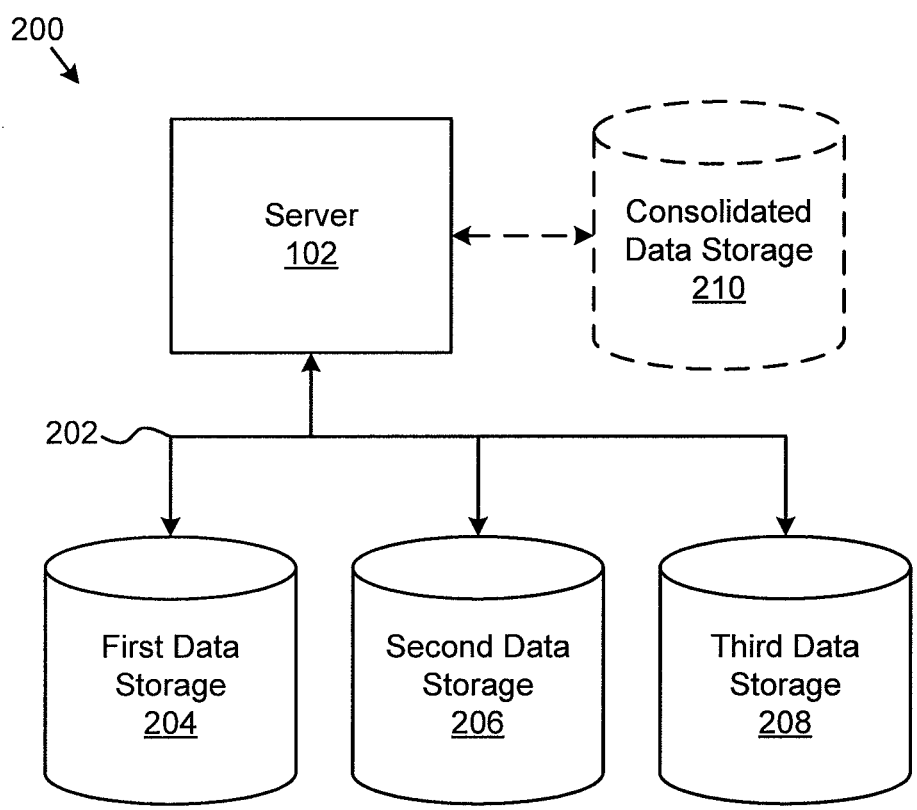
FIG. 2 is a schematic block diagram illustrating one embodiment of a database system for activation-based marketing.

FIG. 2 illustrates one embodiment of a data management system 200 configured to store and manage data for activation-based marketing. In one embodiment, the system 200 may include a server 102. The server 102 may be coupled to a data-bus 202. In one embodiment, the system 200 may also include a first data storage device 204, a second data storage device 206 and/or a third data storage device 208. In further embodiments, the system 200 may include additional data storage devices (not shown). In such an embodiment, each data storage device 204-208 may host a separate database of demographic information, response information, activation index values, and the like. The customer information in each database may be keyed to a common field or identifier, such as an individual's name, social security number, customer number, or the like. Alternatively, the storage devices 204-208 may be arranged in a RAID configuration for storing redundant copies of the database or databases through either synchronous or asynchronous redundancy updates.

In one embodiment, the server 102 may submit a query to selected data storage devices 204-206 to collect a consolidated set of data elements associated with an individual or group of individuals. The server 102 may store the consolidated data set in a consolidated data storage device 210. In such an embodiment, the server 102 may refer back to the consolidated data storage device 210 to obtain a set of data elements associated with a specified individual. Alternatively, the server 102 may query each of the data storage devices 204-208 independently or in a distributed query to obtain the set of data elements associated with a specified individual. In another alternative embodiment, multiple databases may be stored on a single consolidated data storage device 210.

In various embodiments, the server 102 may communicate with the data storage devices 204-210 over the data-bus 202. The data-bus 202 may comprise a SAN, a LAN, or the like. The communication infrastructure may include Ethernet, Fibre-Chanel Arbitrated Loop (FC-AL), Small Computer System Interface (SCSI), and/or other similar data communication schemes associated with data storage and communication. For example, the server 102 may communicate indirectly with the data storage devices 204-210; the server may first communicate with a storage server or storage controller 106.

In one example of the system 200, the first data storage device 204 may store data associated with insurance claims made by one or more individuals. The insurance claims data may include data associated with medical services, procedures, and prescriptions utilized by the individual. In one particular embodiment, the first data storage device 202 included insurance claims data for over 56 million customers of a health insurance company. The database included claims data spanning over 14 years. Of those 56 million members, 26 million had a five year history or more. The health insurance claims data may be utilized by the server 102 for identification of marketing opportunities (e.g., marketing of prescription drugs or preventative health programs), determination of the individual's attitude toward healthcare as evidenced through service utilization; determination of activation indexes, and the like.

In one embodiment, the second data storage device 206 may store demographic data associated with the individual. The demographic data may include one or more of the age, gender, ethnicity, marital status, number of children, income level, credit rating, education level, and the like. In one embodiment, the demographic data may include marketing information available from a commercial direct marketing data provider.

The third data storage device 208 may store response data associated with the individual. For example, the third data storage device 208 may include data associated with the individual's response to previous marketing communications. Such data may include transactions on a website, calls to a customer service line, or enrollment in marketed programs or services.

A fourth data storage device (not shown) may store an activation index associated with the individual. For example, the activation index data may be obtained from commercially available sources, such as the Consumer Activation Index™ available from United Health Group®.

The server 102 may host a software application configured for activation-based marketing. The software application may further include modules for interfacing with the data storage devices 204-210, interfacing a network 108, interfacing with a user, and the like. In a further embodiment, the server 102 may host an engine, application plug-in, or application programming interface (API). In another embodiment, the server 102 may host a web service or web accessible software application.

Figure 3:
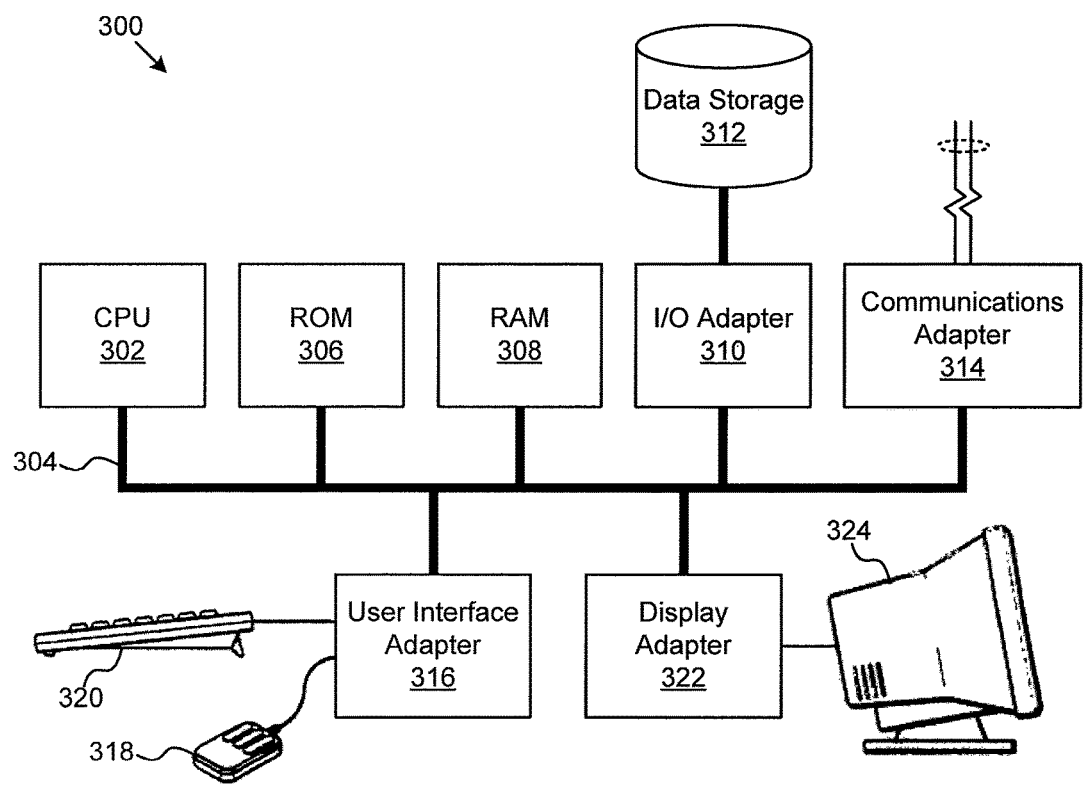
FIG. 3 is a schematic block diagram illustrating one embodiment of a computer system that may be used in accordance with certain embodiments of the system for activation-based marketing.

FIG. 3 illustrates a computer system 300 adapted according to certain embodiments of the server 102 and/or the user interface device 110. The central processing unit (CPU) 302 is coupled to the system bus 304. The CPU 302 may be a general purpose CPU or microprocessor. The present embodiments are not restricted by the architecture of the CPU 302, so long as the CPU 302 supports the modules and operations as described herein. The CPU 302 may execute the various logical instructions according to the present embodiments. For example, the CPU 302 may execute machine-level instructions according to the exemplary operations described below with reference to FIG. 7.

The computer system 300 also may include Random Access Memory (RAM) 308, which may be SRAM, DRAM, SDRAM, or the like. The computer system 300 may utilize RAM 308 to store the various data structures used by a software application configured for activation-based marketing. Thus, the computer system may be suitable programmed for activation-based marketing. The computer system 300 may also include Read Only Memory (ROM) 306 which may be PROM, EPROM, EEPROM, optical storage, or the like. The ROM may store configuration information for booting the computer system 300. The RAM 308 and the ROM 306 hold user and system 100 data.

The computer system 300 may also include an input/output (I/O) adapter 310, a communications adapter 314, a user interface adapter 316, and a display adapter 322. The I/O adapter 310 and/or the user interface adapter 316 may, in certain embodiments, enable a user to interact with the computer system 300 in order to input information for user controls, identification of a product, service, or program for marketing, identification of a target individual, and note regarding the target individual's response to the marketing approach. In a further embodiment, the display adapter 322 may display a graphical user interface associated with a software or web-based application for activation-based marketing.

The I/O adapter 310 may connect to one or more storage devices 312, such as one or more of a hard drive, a Compact Disk (CD) drive, a floppy disk drive, a tape drive, to the computer system 300. The communications adapter 314 may be adapted to couple the computer system 300 to the network 108, which may be one or more of a LAN and/or WAN, and/or the Internet. The user interface adapter 316 couples user input devices, such as a keyboard 320 and a pointing device 318, to the computer system 300. The display adapter 322 may be driven by the CPU 302 to control the display on the display device 324.

The present embodiments are not limited to the architecture of system 300. Rather the computer system 300 is provided as an example of one type of computing device that may be adapted to perform the functions of a server 102 and/or the user interface device 110. For example, any suitably programmed processor-based device may be utilized including without limitation, including personal data assistants (PDAs), computer game consoles, and multi-processor servers. Moreover, the present embodiments may be implemented on application specific integrated circuits (ASIC) or very large scale integrated (VLSI) circuits. In fact, persons of ordinary skill in the art may utilize any number of suitable structures capable of executing logical operations according to the described embodiments.

Figure 4:
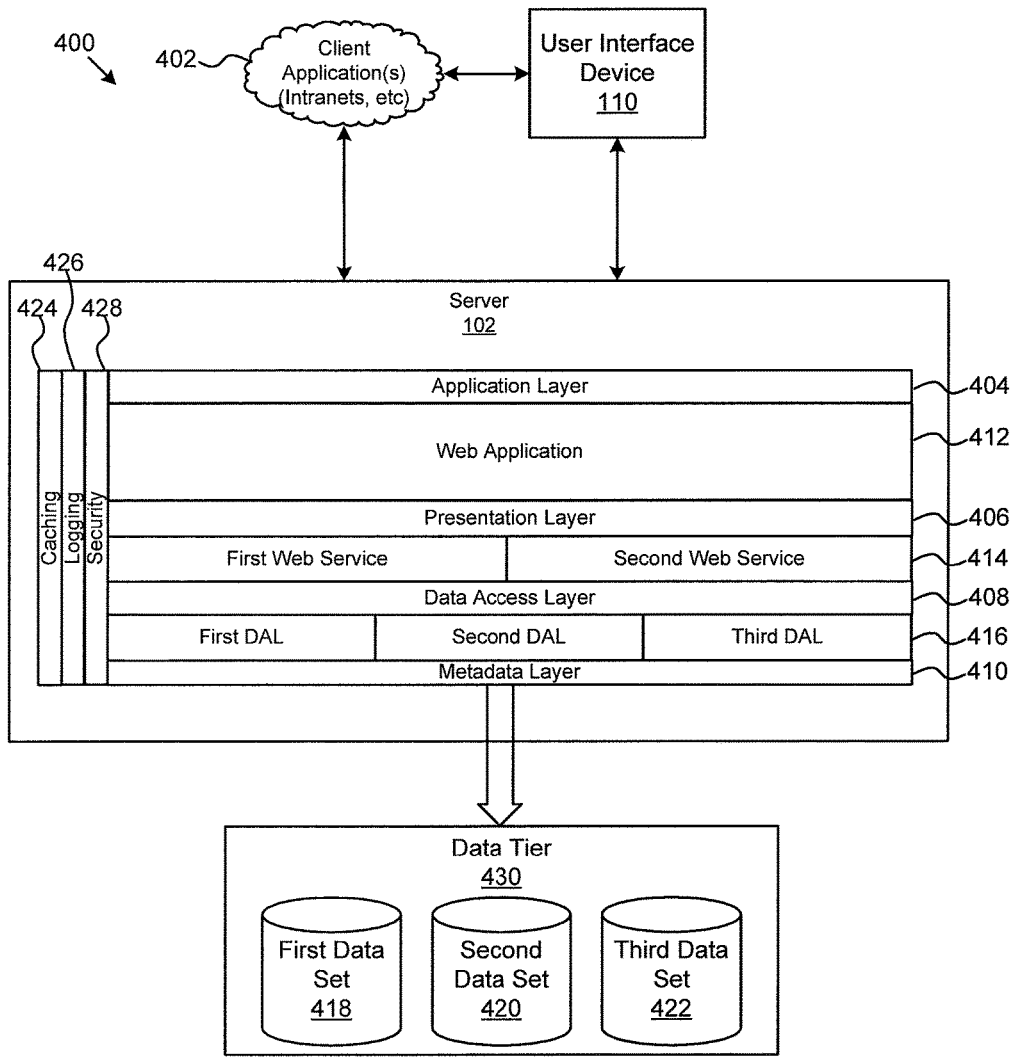
FIG. 4 is a schematic logical diagram illustrating one embodiment of abstraction layers of operation in a system for activation-based marketing.

FIG. 4 illustrates one embodiment of a network-based system 400 for activation-based marketing. In one embodiment, the network-based system 400 includes a server 102. Additionally, the network-based system 400 may include a user interface device 110. In still a further embodiment, the network-based system 400 may include one or more network-based client applications 402 configured to be operated over a network 108 including an intranet, the Internet, or the like. In still another embodiment, the network-based system 400 may include one or more data storage devices 104.

The network-based system 400 may include components or devices configured to operate in various network layers. For example, the server 102 may include modules configured to work within an application layer 404, a presentation layer 406, a data access layer 408 and a metadata layer 410. In a further embodiment, the server 102 may access one or more data sets 418-422 that comprise a data layer or data tier 430. For example, a first data set 418, a second data set 420 and a third data set 422 may comprise a data tier 430 that is stored on one or more data storage devices 204-208.

One or more web applications 412 may operate in the application layer 404. For example, a user may interact with the web application 412 though one or more I/O interfaces 318, 320 configured to interface with the web application 412 through an I/O adapter 310 that operates on the application layer. In one particular embodiment, a web application 412 may be provided for activation-based marketing that includes software modules configured to perform the steps of generating a personalized action plan corresponding to a customer, where the personalized action plan is generated based upon customer information comprising: a consumer activation index of the customer, and demographic information about the customer.

In a further embodiment, the server 102 may include components, devices, hardware modules, or software modules configured to operate in the presentation layer 406 to support one or more web services 414. For example, a web application 412 may access or provide access to a web service 414 to perform one or more web-based functions for the web application 412. In one embodiment, a web application 412 may operate on a first server 102 and access one or more web services 414 hosted on a second server (not shown) during operation.

For example, a web application 412 for activation-based marketing may access a first web service 414 for collecting an activation index value, such as the Consumer Activation Index™ from a third-party provider. The web services 414 may receive an identifier associated with the target individual. In response, the web service 414 may return data the Consumer Activation Index™ value. One of ordinary skill in the art will recognize various web-based architectures employing web services 414 for modular operation of a web application 412.

In one embodiment, a web application 412 or a web service 414 may access one or more of the data sets 418-422 through the data access layer 408. In certain embodiments, the data access layer 408 may be divided into one or more independent data access layers 416 for accessing individual data sets 418-422 in the data tier 430. These individual data access layers 416 may be referred to as data sockets or adapters. The data access layers 416 may utilize metadata from the metadata layer 410 to provide the web application 412 or the web service 414 with specific access to the data set 412.

For example, the data access layer 416 may include operations for performing a query of the data sets 418-422 to retrieve specific information for the web application 412 or the web service 414. In a more specific example, the data access layer 416 may include a query for demographic response data associated with a target individual.

Figure 5:
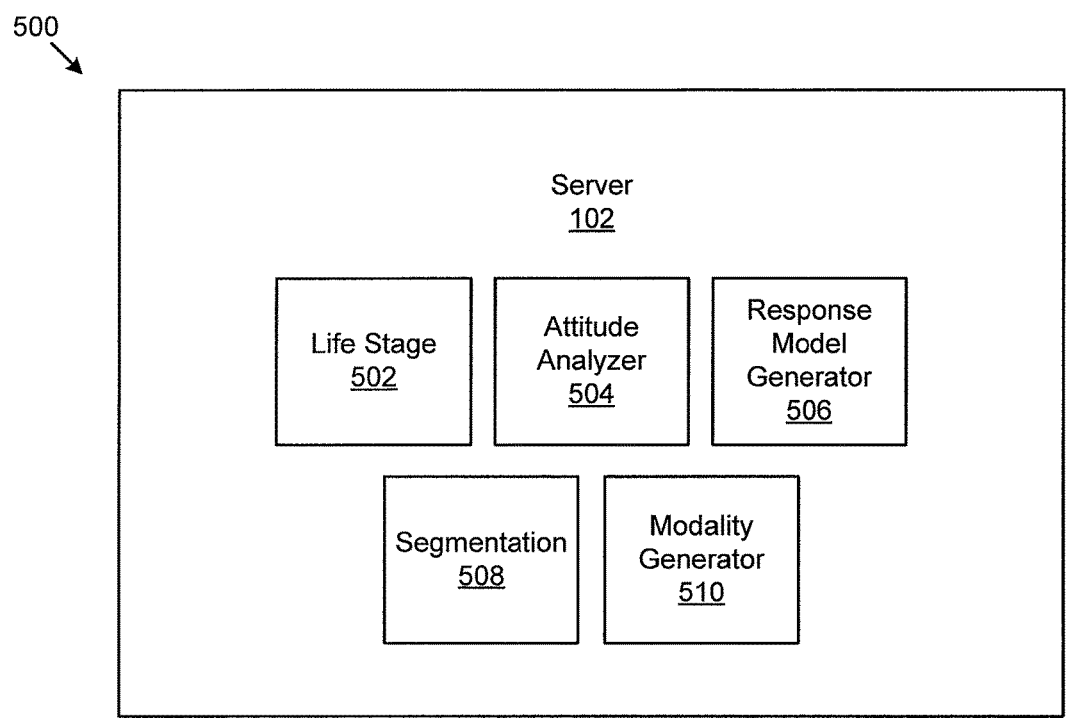
FIG. 5 is a schematic block diagram illustrating one embodiment of an apparatus for activation-based marketing.

FIG. 5 illustrates one embodiment of an apparatus 500 for activation-based marketing. In one embodiment, the apparatus 500 is a server 102 configured to load and operate software-defined modules 502-510 configured for activation-based marketing. Alternatively, the apparatus 500 may include hardware modules 502-510 configured with analogue or digital logic, firmware executing FPGAs, or the like configured to determine a life stage associated with a target individual, determine an attitudinal segment associated with the target individual, determine a response model associated with the target individual, assign the target individual to at least one of a predetermined set of segmentation groups in response to the life stage, the attitudinal segment, and the response model associated with the individual, and generate a personalized communication modality tailored to the target individual in response to the segmentation group assigned to the target individual. In such embodiments, the apparatus 500 may include a life stage module 502, an attitude analyzer 504, a response model generator 506, a segmentation module 508, and a modality generator 510.

In one embodiment, the life stage module 502 may determine a life stage associated with a target individual. For example, the life stage module 502 may analyze demographic data to determine the present stage of life of the target individual. For example, the life stage module 502 may group the target individual into an age group, a gender group, a marital status group, a socioeconomic group, or the like. In one embodiment, the life stage module 502 may analyze the life stage of the target individual by comparing the demographic data associated with the target individual against predetermined tables, threshold values, or other criteria for determining life stage groupings.

In one embodiment, the attitude analyzer 504 may determine an attitudinal segment associated with the target individual. For example, the attitude analyzer 504 may gather information about the target individual and categorize the individual according to a set of attitudinal segments. In one embodiment, the attitudinal segment generally describes the psychological influences that affect the target individual's overall attitude in life and drive behavior changes. In one embodiment, the attitude analyzer 504 may analyze financial management data, health management data, and engagement data as described below in greater detail with reference to FIG. 6.

In one embodiment, the response model generator 506 may determine a response model associated with the target individual. For example, the response model generator 506 may generate a model describing the target individual's predicted response to communications of various forms. In one embodiment, the response model generator 506 may obtain communication response data from one of the data storage devices 204-210. For example, the response model generator 506 may retrieve historical response data associated with the target individual. The historical response data may include an indicant of a type of communication sent to the target individual, as well as an indicant of the target individual's response to that communication. In one embodiment, a response may include enrollment in a program, consideration of a new service, logging into a web site, willingness to discuss a prescription drug with a customer service representative over the telephone, or the like. In another embodiment, the response data may indicate that the target individual did not respond at all to a particular communication, such as a direct mailer.

In one embodiment, the segmentation module 508 may assign the target individual to at least one of a predetermined set of segmentation groups in response to the life stage, the attitudinal segment, and the response model associated with the target individual. For example, the segmentation module 508 may categorize the target individual according to one or more predetermined master segments. The master segments may be descriptive of the aggregate of the life stage, attitude, and responsiveness of the target individual.

In one embodiment, the modality generator 510 may generate a personalized action plan corresponding to the a customer. For example, the modality generator 510 may generate a personalized communication modality tailored to the target individual in response to the segmentation group assigned to the target individual. The modality generator 510 may generate the personalized action plan and/or communication modality in response to the master segment assigned to the target individual by the segmentation module 508.

Figure 6:
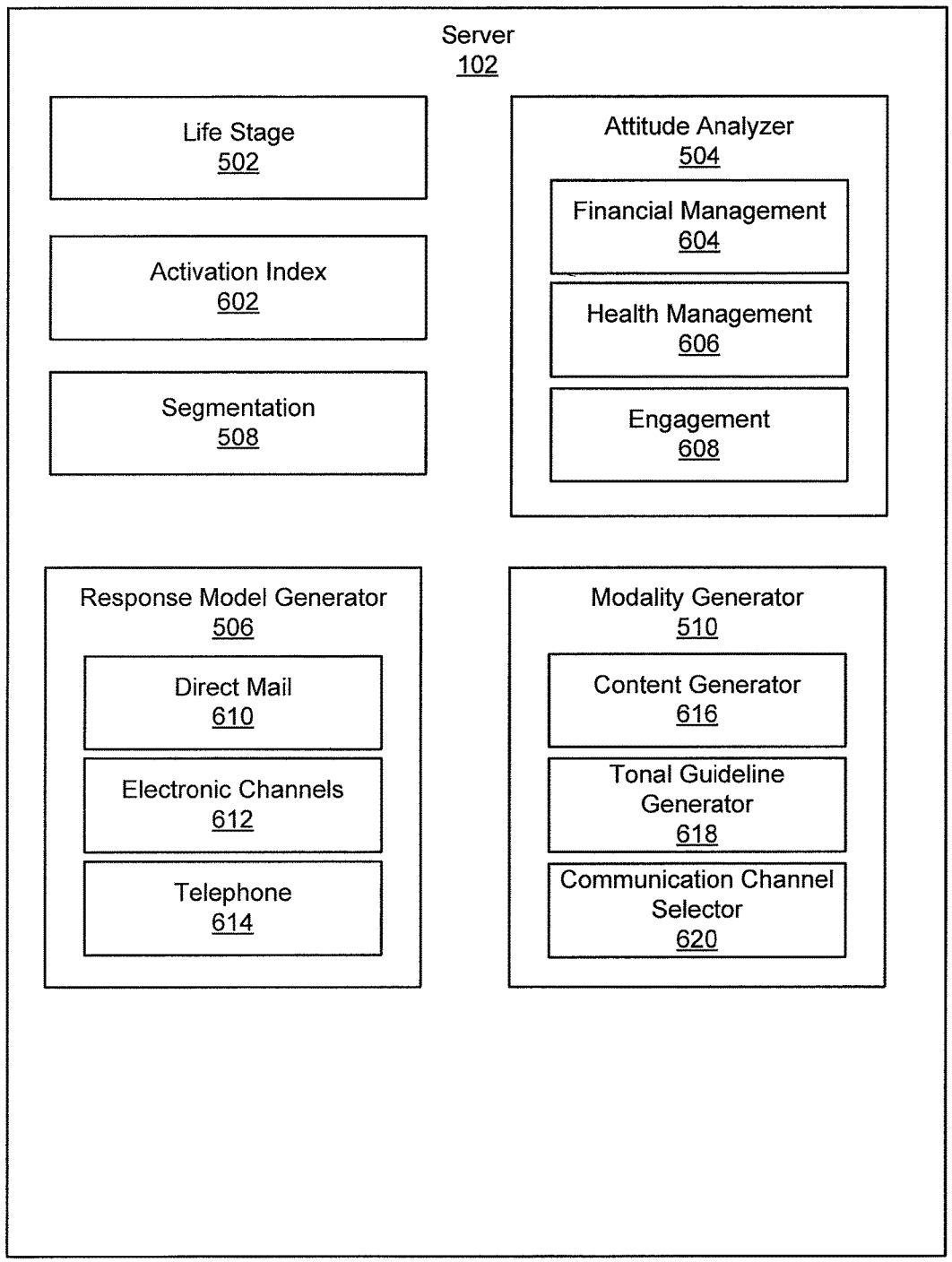
FIG. 6 is a detailed schematic block diagram illustrating one embodiment of a server suitably programmed for activation-based marketing.

FIG. 6 illustrates another embodiment of a server 102. In the depicted embodiment, the server may include the life stage module 502, the attitude analyzer 504, the response model generator 506, the segmentation module 508, and the modality generator 510 as described above with relation to FIG. 5. Additionally, the server 102 may include an activation index module 602.

In one embodiment, the activation index module 602 is configured to obtain an activation index value, such as a Consumer Activation Index™ available from United Health Group®. For example, the activation index module 602 may include an API or the like for interfacing the Consumer Activation Index™ provider. In one embodiment, the activation index may be obtained from a web service 414. Alternatively, the activation index may be obtained through a direct computer-computer connection, a modem connection, or a network connection. One of ordinary skill in the art will recognize alternative methods for obtaining the activation index from the provider.

Consumer Activation Index™ may include an index value providing a measurement of a health insurance customer's engagement level within his/her health plan. For example, the Consumer Activation Index™ may be similar to a FICO™ score, except that the Consumer Activation Index™ may be a measurement of health plan utilization rather than credit utilization. The Consumer Activation Index™ may include an aggregated quantization of a the customer's clinical decisions, service decisions, and healthcare-related financial decisions. For example, clinical decisions may include utilization of wellness exams, diabetes monitoring, cancer screenings, and the like. Service decisions may include utilization of less expensive service alternatives, such as online information services or Nurseline™. Financial decisions may include utilization of providers that are within a specified health plan network and/or utilization of generic drugs. In one embodiment, commercially available metrics, such as Consumer Activation Index™, may provide metrics of these types of factors.

In one embodiment, the attitude analyzer 504 may further include a financial management analyzer 604, a health management analyzer 606, and an engagement analyzer 608. In such an embodiment, the attitude analyzer 504 may determine a metric of the target individual's attitude by aggregating the metrics provided by these modules 604-608.

For example, the financial management analyzer 604 may collect data regarding the target individual's financial management. This data may include credit information, savings information, budget information, an indicator of whether the target individual has executed a will, and indication of whether the individual has a financial advisor, accountant, or the like. This information may be collected through surveys directed to the target individual. Alternatively, this information may be obtained from third party information providers. In one embodiment, the financial management analyzer 604 may generate, for example, a financial management score. The financial management score may be calculated by assigning a score of, e.g., '1,' '0,' or the like to each of the criteria considered. Alternatively, the score values may be weighted according to the importance or extent of the financial management characteristic being measured.

For example, the financial management analyzer 604 may assign a '1' to an individual who has executed a will. In another embodiment, the financial management analyzer may assign a '1' for every thousand dollars the target individual has in savings. In still another embodiment, if it is deemed particularly important, a weighted score may be assigned if the target individual has an accountant or a financial advisor. The scores may be aggregated into a composite financial management score.

In one embodiment, the health management analyzer 606 may collect information regarding the target individual's health management style. In a further embodiment, the health management analyzer 606 may provide a metric or health management score representing the target individual's attitude toward health management. The health management analyzer 606 may analyze lifestyle choices, such as vegetarianism, memberships to health clubs, etc. Additionally, the health management analyzer 606 may analyze the target individual's history and quality of healthcare, medical consumption habits, value of insurance, exercise habits, and the like. The method of calculating such a score may be substantially the same as that described above with relation to the financial management analyzer 604.

In one embodiment, the engagement analyzer 608 may gather information regarding the target individual's willingness to engage. For example, the engagement analyzer 608 may consider consumer habits, media habits and usage, interest in new products, survey results regarding happiness and psychological state, etc. The engagement analyzer 608 may also provide a score as described above with relation to the financial management analyzer 604.

In a further embodiment, metrics, such as scores, provided by the financial management analyzer 604, the health management analyzer 606 and the engagement analyzer 608 may be aggregated into a composite attitude indicator. The attitude indicator may include a score, an index, a metric, a quantitative measure, a graph, or the like.

In certain embodiments, the response model generator 506 may further include a direct mail module 610, an electronic channel model 612, and a telephone module 614. In such an embodiment, the response model generator 506 may generate a response model of the target individual based on the aggregated response data for various marketing communication forms exemplified by these modules 610-614. The communication forms may also include door hangers, package inserts, magazines, newspapers, radio, television, internet banner ads, digital campaigns, pay-per-click ads, billboards, transit ads, or the like. The response information may concern the target individual or a group of individuals sharing one or more predetermined attributes with the targeted individual, e.g., a cohort group.

For example, the direct mail module 610 may collect information regarding the target individual or group's historical response or predicted response to a paper-based medium, such as direct mail or the like, including, but not limited to, postcards, letters, invitation to programs, statements, coupons, advertising circulars, catalogs, free trial CDs, pre-approved credit card applications, and other unsolicited merchandising invitations delivered by mail or to homes and businesses, or delivered to consumers' mailboxes by delivery services other than the Post Office. The target individual may be instructed to take a specific action, for instance to call a free phone number or visit a website, and the response information may then be generated and recorded if the individual follows the instructions. The response information may be collected by surveys directed to the target individual or from third party information providers. The response information may be evaluated on a scale or assigned a score based on the responses from the target individual or group. The response information may also include additional information like marketing frequency, the time period between communication and response, the response percentage of the cohort group of individuals, etc. For example, a score of '0' may be assigned to no response to the direct mail from the target individual in a predetermined time period (e.g., a year).

In one embodiment, the electronic channel module 612 may collect information regarding the individual or group's response to communications via various electronic channels, such as emails, portal messaging, online coaching, short message service or silent messaging service (SMS) or any online communication that may be associated with internet search (e.g., search engines like Google, Yahoo, or the like) or use of websites (e.g., social media websites such as Facebook, Twitter, Linkedin, Myspace, or the like). In the case of email marketing, response information may be collected by email tracking to monitor if the target individual or group receives the email, opens the email and/or clicks a website included in the email. The response information may also be collected by survey or third party providers and be processed to generate a score substantially the same as that described above with relation to the direct mail module 610.

In one embodiment, the telephone module 614 may gather information regarding the target individual or group's response to phone-based communication, such as telephone, voice mail messages, or the like, which can be inbound, outbound, or interactive voice response (IVR). The telephone module 614 may analyze information such as direct response to the communication and generate a score substantially the same as describe above with relation to other response model generate modules.

In a further embodiment, the modality generator 510 may include a content generator 616, a tonal guideline generator 618, and a communication channel selector 620. For example, the modality generator may generate a customized communication modality for the target individual in response to an integrated analysis of the individual's life stage, attitude, and response model to satisfy certain criteria, such as an optimal response rate, or an optimal acceptance rate. The integrated analysis may be through identifying the individual with at least one or more segments by the segmentation module 508 and a customized communication plan suitable for the individual may be generated in response to the identifying segmentation group(s).

For example, the content generator 616 may generate a customized content in response to the segmentation group or an aggregation of the life stage, attitude, and response model of the target individual. In a certain aspect, a database of contents may be classified according to various segmentation groups. The content generator 616 may then retrieve the content matching the segmentation group assigned to the target individual or make recommendations for several appropriate contents which suit the segmentation group(s).

In one embodiment, the tonal guideline generator 618 may also create a recommendation for use of language in the communication customized for the target individual. The use of language may include sound attributes and/or mood or attitude encompassed in the customized communication. For example, the tonal guideline may include a recommendation of sound attributes, such as pitch, speed, use of pauses if the communication channels is selected as the phone by the communication channel selector 620. In certain aspects, the tonal guideline generator 618 may also generate a guideline for the attitude/mood toward the target individual, for example, formal, informal, serious, playful, thoughtful, respectful, caring, lively, candid, friendly, enthusiastic, etc. The generation of a customized tonal guideline may be based on the segmentation group(s) the target individual is assigned to.

In one embodiment, the communication channel selector 620 may generate a decision or a recommendation for one or more communication channels suitable for the targeted individual. Such a communication channel may be any channel corresponding to the determined segmentation group. For example, the channel selector 620 may create such decision or recommendation based on its preferences predicted for the segmentation group. A particular example may be a selection of a telephone channel for a segmentation group such as empty nesters to fill in their emotional needs.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 7:
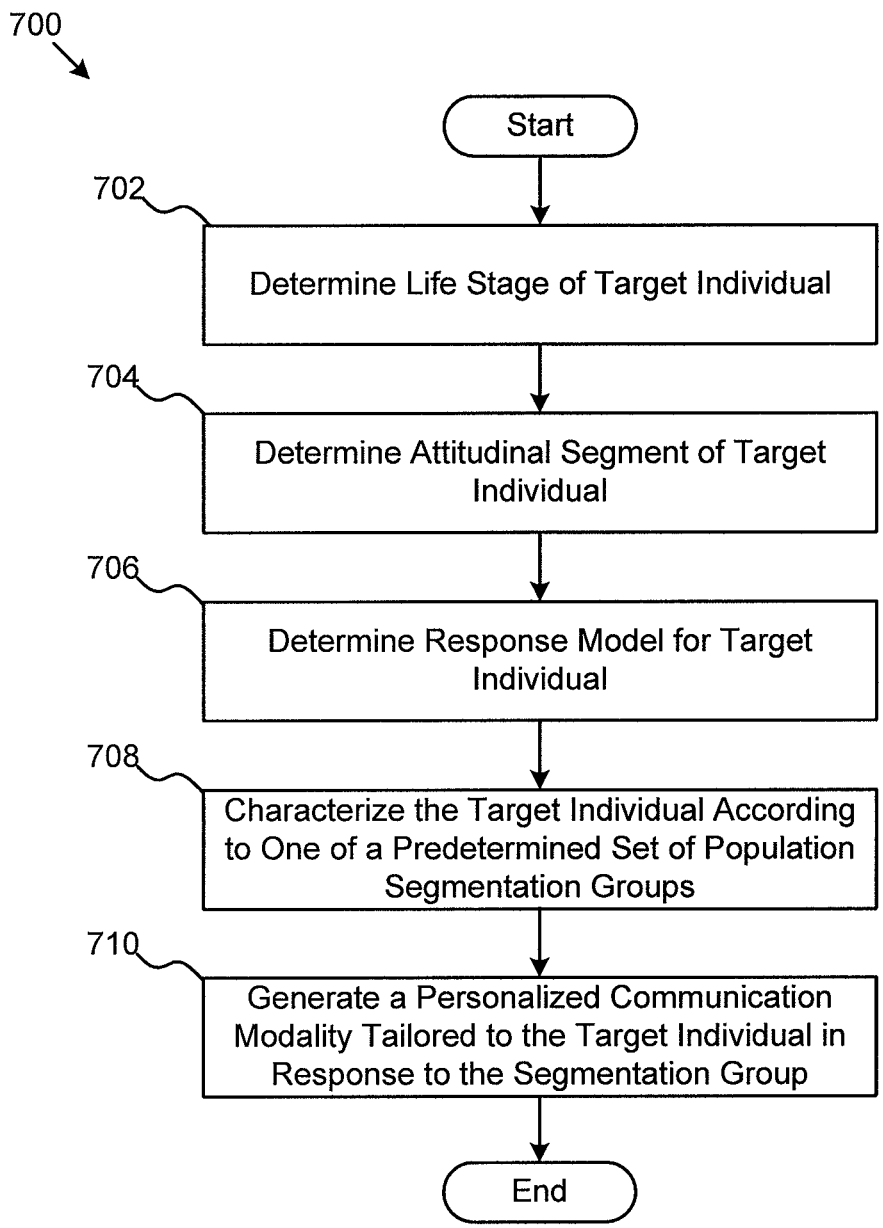
FIG. 7 a schematic flow-chart diagram illustrating one embodiment of a method for activation-based marketing.

FIG. 7 illustrates one embodiment of a method 700 for activation-based marketing. In one embodiment, the method 800 starts when the server 102 collects relevant information about the target individual, including demographic information, information related to attitude, and response information. The method 800 may continue when the life stage module 502 determines 702 a life stage of the target individual, for example, a life stage as a young single, a young family, a mature family, an empty nester, an ill person. The attitude analyzer 504 may determine 704 an attitudinal segment of the target individual, for example, by categorizing member attitudes, perceptions, values, and/or overall engagement in life using cohort matching. The response model generator 506 may determine 706 a response model for the target individual, for example, a prediction of channel and frequency of message delivery on the target individual's propensity to respond to that particular message through a specific channel based on measurement of history responses. The steps 702, 704 and 706 may be performed simultaneously, or sequentially in any order or a predetermined order. An additional step may include measurement of decision making behaviors like a member's engagement level with the health plan, such as consumer activation index (CAI™).

The segmentation module 508 may then characterize 708 the target individual according to one or more of a predetermined set of population segmentation groups in response to the life stage, attitudinal segment, and response model associated with the target individual. In a further embodiment, the modality generator 510 may generate 710 a personalized communication modality to the target individual in response to the assigned segmentation group(s), such as a selection of content, tone, communication channels.

Figure 8:
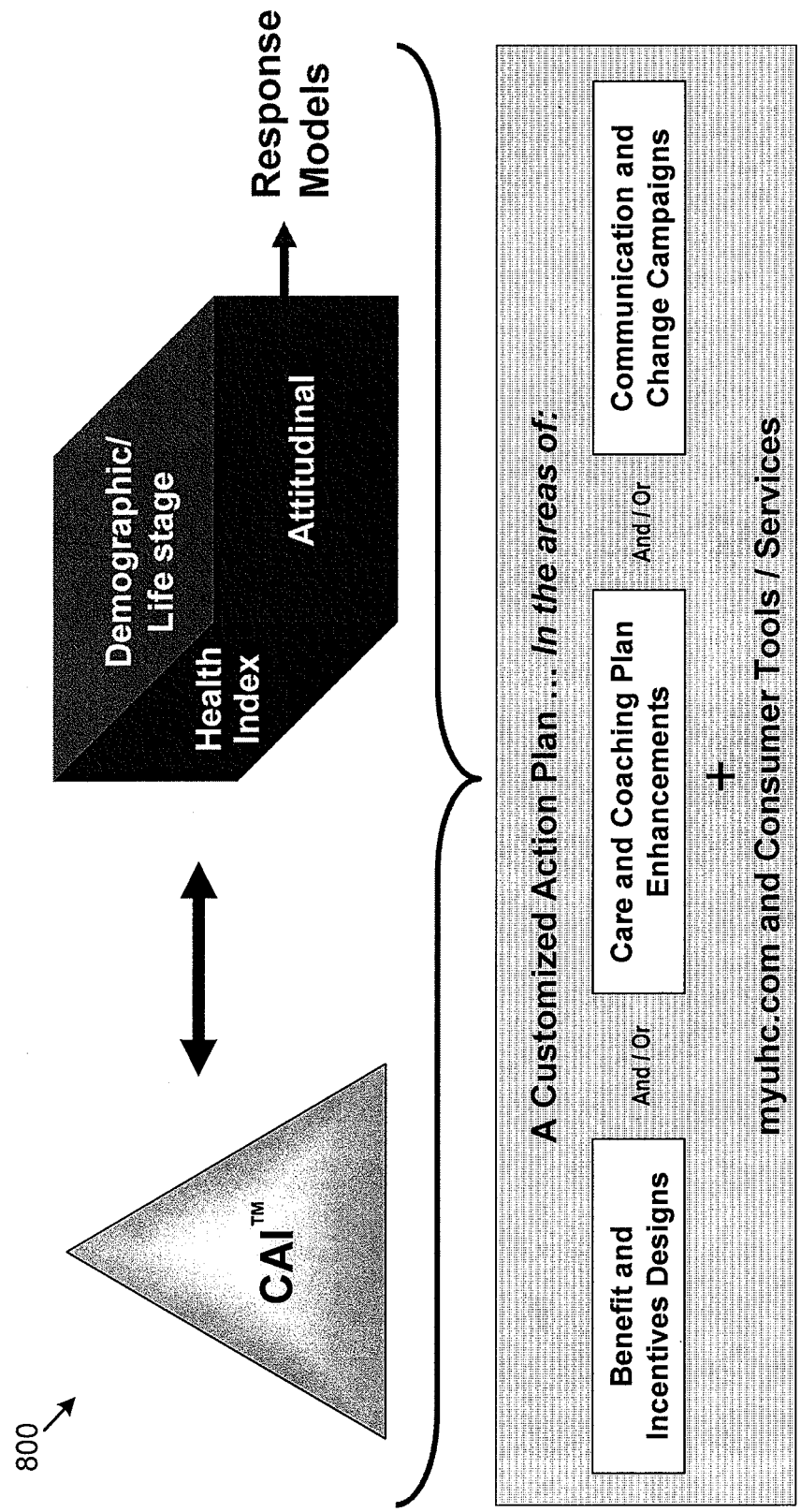
FIG. 8 is a conceptual flow-chart diagram illustrating a further embodiment of a method for activation-based marketing.

FIG. 8 illustrates one embodiment of a method 800 for activation-based marketing. For example, the multi-dimensional method 800 may provide a data-driven approach for member activation and engagement based on life stages (including demographics), attitudinal cohorts, and communication medium preference. The method 800 may allow to design and deliver more relevant and targeted activation through customized communications, incentive and benefit designs, and/or care and coaching plan enhancements, as well as consumer and community-based resources or services (e.g., myuhc.com). It may also increase member participation, reduce engagement costs and ultimately allow to yield higher rate of return (ROI) and behavior change (customer activation index-CAI™). The improvement in behavior changes may reflect more optimal decisions clinically, financially, or service-wise.

Figure 9:
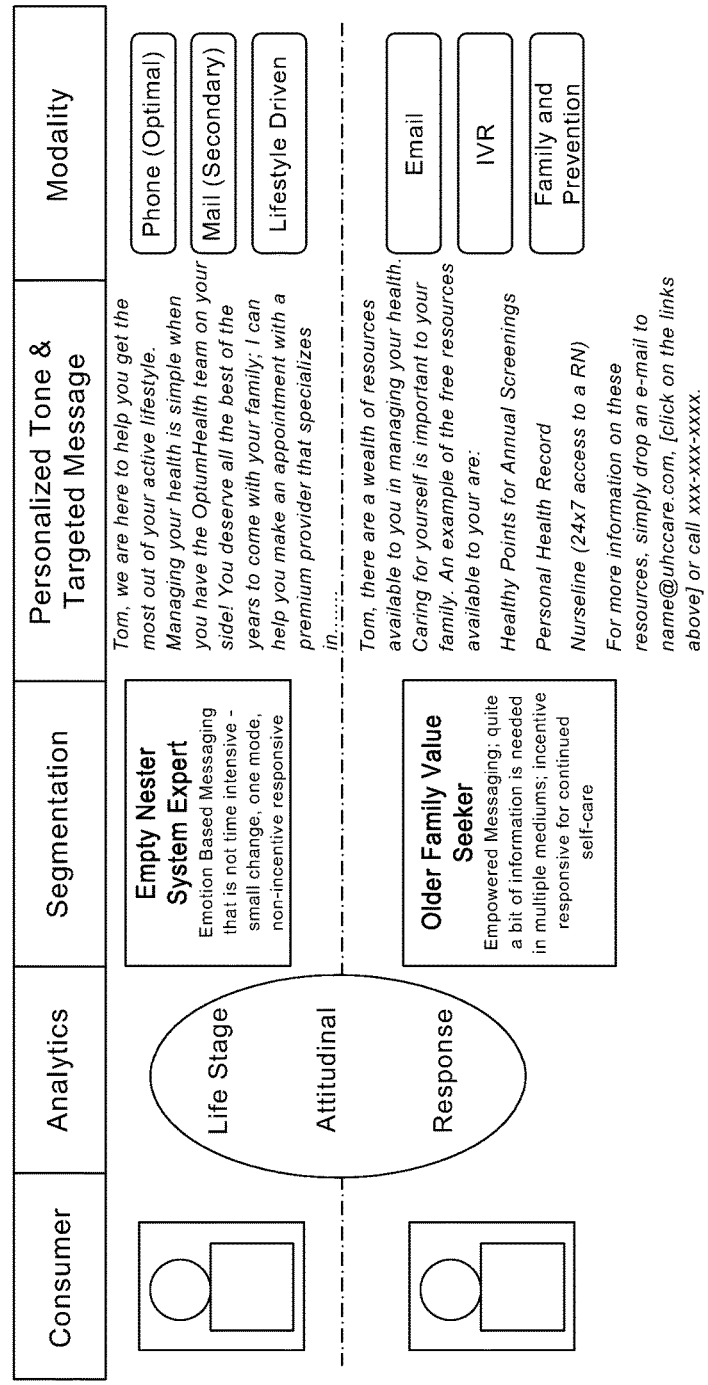
FIG. 9 is conceptual illustration of one embodiment of a method for activation-based marketing.

FIG. 9 illustrates one embodiment of a display 900 for activation-based marketing. For example, a target individual such as consumer may be analyzed by life stage module 502, attitude analyzer 504, and response model generator 506. These analytical results are integrated by a segmentation module 508 to generate segmentation results. An exemplary segmentation group may be "empty nester, system expert, emotion based messaging . . . ," which includes an embodiment of the life stage, an embodiment of the attitude, an embodiment of the response prediction determined for a specific consumer. In response to the segmentation group, a personalized tone, targeted message and channel modality may be generated. In one embodiment, the message may be delivered in a preferred channel for the consumer, with a tone that resonates with the consumer, and in language that reflects understanding of the consumer's individual needs. For example, for a consumer determined to belong to the segmentation group "empty nester, system expert, and emotion based messaging . . . ," a modality generator 510 may determine that the phone may be the optimal channel, and a personalized message with a warm and caring tone and a content focused on help and understanding the consumer's needs may help create a trusting relationship with the consumer.

FIG. 10 illustrates one embodiment of a display 900 for activation-based marketing. An exemplary scenario for activation-based marketing is provided, For example, Joe Lamb is a high risk diabetic with a health index that indicates that he is receptive to changing his health care behavior. Joe's consumer profile is generated from the segmentation analysis of life stage, attitude, and response. The consumer profile indicates that Joe may prefer one method of communication—the phone. Joe's case is assigned to his nurse, Susan. Before calling him, Susan reviews the rest of Joe's profile, such as presented in display 900. The display 900 is an integrated consumer and medical profile, which allows the nurse to have all of the relevant information regarding Joe in a consolidated view, for example, attitude analysis (system expert), demographic information and response index as shown in profile 1002. Medial opportunities and preference information are shown.

Figure 11:
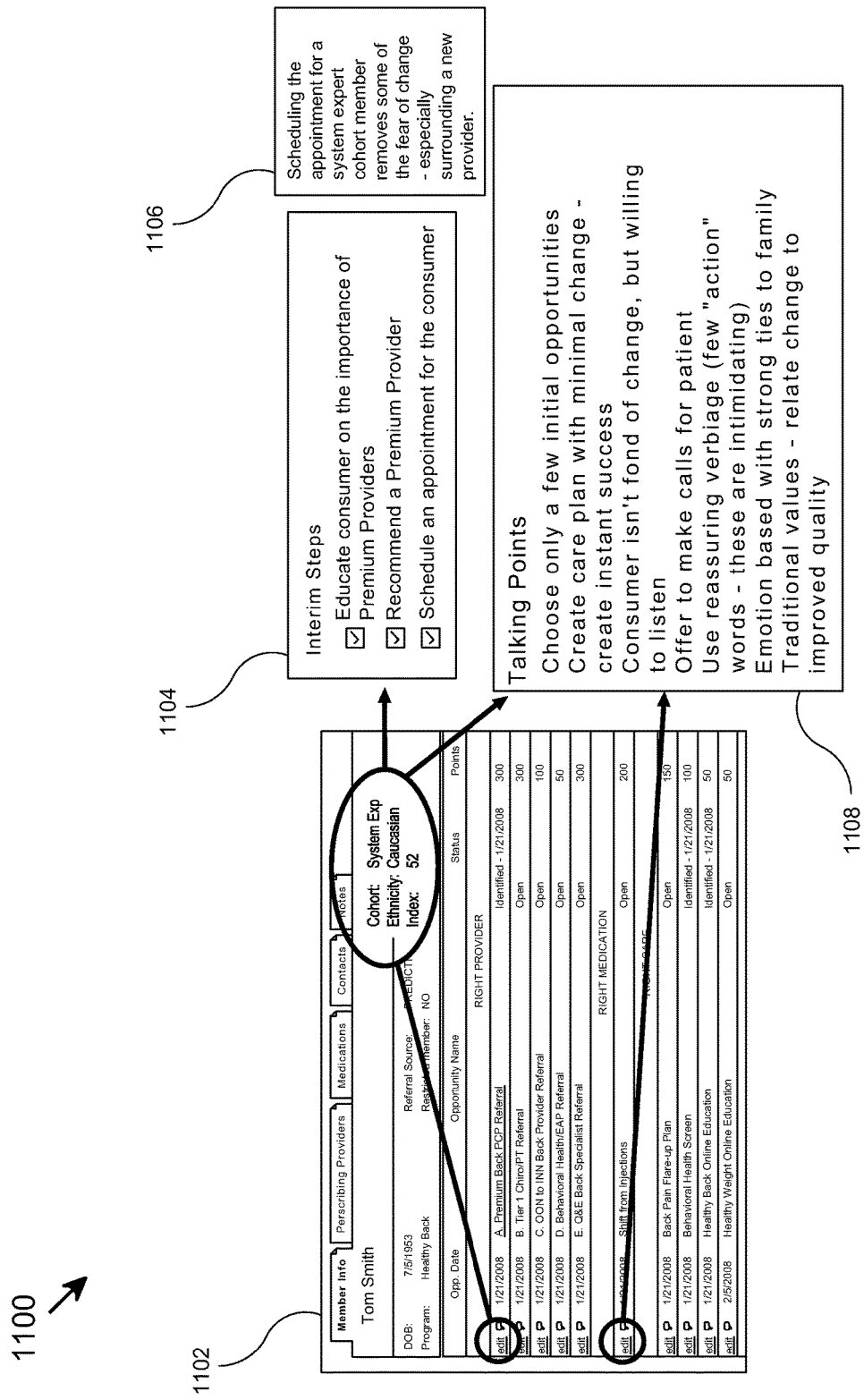
FIG. 11 is a screen-shot diagram illustrating a further embodiment of a display for activation-based marketing.

FIG. 11 illustrates one embodiment of a display 900 for activation-based marketing. Based on analysis of the consumer profile 1102, especially the circled components, a personalized activation plan may be generated by the modality generator 510, which include interim steps 1104, communication modality 1106 by appointment scheduling, and communication content 1108. Through the combination of these dynamic assets and steps, the inventors may help create a relationship with a targeted individual by inducing behavioral changes. This approach may be leveraged throughout the entire consumer experience—from on-boarding, clinical management and incentives. The communications and interactions with the targeted individual could be consistent with the individual's segmentation group based on combination of the life stage, attitudinal cohort analysis, and response model.

All of the methods disclosed and claimed herein can be made and executed without undue experimentation in light of the present disclosure. While the apparatus and methods of this invention have been described in terms of preferred embodiments, it will be apparent to those of skill in the art that variations may be applied to the methods and in the steps or in the sequence of steps of the method described herein without departing from the concept, spirit and scope of the invention. In addition, modifications may be made to the disclosed apparatus and components may be eliminated or substituted for the components described herein where the same or similar results would be achieved. All such similar substitutes and modifications apparent to those skilled in the art are deemed to be within the spirit, scope, and concept of the invention as defined by the appended claims.

What is claimed is:

1. method comprising:
   storing customer information associated with a customer in a plurality of data storage devices within a data layer of a layered network, the customer information keyed to a common identifier and comprising: a consumer activation index of the customer, and demographic information about the customer, wherein the consumer activation index includes a quantization of the customer's past clinical decisions, service decisions, and health plan utilization, wherein the quantization of service decisions is based in part on utilization of less expensive service alternatives by the consumer;
   querying the plurality of data storage devices for the common identifier to collect a consolidated set of data elements associated with the customer;
   accessing the consolidated set of data elements by utilizing metadata specific to the consolidated set of data elements, the consolidated data set accessible to an application layer of a server through a data access layer configured to utilize the metadata from a metadata layer;
   generating, using a processor within the application layer, a personalized action plan for the customer by determining an attitude segment for the customer based on the consumer activation index of the customer and demographic information about the customer, wherein the attitude segment classifies the customer into a group representing at least one of perceptions, an engagement in life, and psychological influences that affect an overall attitude in life and drive behavior changes;
   generating a model describing a predicted response to a plurality of communication modalities of various forms by assigning a customer-specific score to individual communication modalities of the plurality of communication modalities based on historical response data associated with the customer that includes an indication of a modality of a communication sent to the customer and a response to the sent communication, wherein the plurality of communication modalities comprise two or more communication modalities selected from the group consisting of: email, portal messaging, online coaching, short message service, silent messaging service, online communication associated with internet search, website, telephone, voice mail, interactive voice response, postcards, letters, invitation to programs, statements, coupons, advertising circulars, catalogs, and free trial media;
   selecting a vocalized communication modality from the plurality of communication modalities using the generated model describing the predicted response to the plurality of communication modalities;
   generating customized message content based on the personalized action plan, wherein the generating of the customized message content comprises generating tonal guidelines for a vocalized communication based on the attitude segment for the customer; and prompting the vocalized communication with the customer in accordance with the customized message content by providing the generated tonal guidelines and the customized message content to a person contacting the customer over the selected vocalized communication modality.

2. The method of claim 1, where the personalized action plan is generated based further upon a health index of the customer.

3. The method of claim 1, where the step of generating the personalized action plan further comprises determining an attitudinal segment for the customer based on financial, health and engagement information of the customer.

4. A computer program product comprising a non-transitory computer-readable medium embodying executable instructions for:

storing customer information associated with a customer in a plurality of data storage devices within a data layer of a layered network, the customer information keyed to a common identifier and comprising: a consumer activation index of the customer, and demographic information about the customer, wherein the consumer activation index includes a quantization of the customer's past clinical decisions, service decisions, and health plan utilization, wherein the quantization of service decisions is based in part on utilization of less expensive service alternatives by the consumer;

querying the plurality of data storage devices for the common identifier to collect a consolidated set of data elements associated with the customer;

accessing the consolidated set of data elements by utilizing metadata specific to the consolidated set of data elements, the consolidated data set accessible to an application layer of a server through a data access layer configured to utilize metadata from a metadata layer;

generating a personalized action plan for the customer by determining an attitude segment for the customer based on the consumer activation index of the customer and demographic information about the customer, wherein the attitude segment classifies the customer into a group representing at least one of perceptions, an engagement in life, and psychological influences that affect an overall attitude in life and drive behavior changes;

generating a model describing a predicted response to a plurality of communication modalities of various forms by assigning a customer-specific score to individual communication modalities of the plurality of communication modalities based on historical response data associated with the customer that includes an indication of a modality of a communication sent to the customer and a response to the sent communication, wherein the plurality of communication modalities comprise two or more communication modalities selected from the group consisting of: email, portal messaging, online coaching, short message service, silent messaging service, online communication associated with internet search, website, telephone, voice mail, interactive voice response, postcards, letters, invitation to programs, statements, coupons, advertising circulars, catalogs, and free trial media;

selecting a vocalized communication modality from the plurality of communication modalities using the generated model describing the predicted response to the plurality of communications;

generating customized message content based on the personalized action plan, wherein the generating of the customized message content comprises generating tonal guidelines for a vocalized communication; and prompting the vocalized communication with the customer in accordance with the customized message content by providing the generated tonal guidelines and the customized message content to a person contacting the customer over the selected vocalized communication modality.

5. The computer program product of claim 4, where the personalized action plan is also generated from attitudinal information about the customer.

6. The computer program product of claim 4, where the personalized action plan is also generated from responsiveness information about the customer.

7. The computer program product of claim 6, where the personalized action plan is also generated from attitudinal information about the customer.

8. The computer program product of claim 4, where the personalized action plan comprises one or more items selected from the group consisting of: benefit offers, incentive offers, policy enhancements, care enhancements, coaching enhancements, and communication enhancements.

9. The computer program product of claim 4, where the instructions for generating the personalized action plan comprise instructions for: selecting two or more predefined action items corresponding to the customer information from one or more databases storing a plurality of predefined action items.

10. The computer program product of claim 4, further comprising instructions for: outputting at least a portion of the personalized action plan for the customer.

11. The computer program product of claim 10, where the portion of the personalized action plan is output responsive to a communication link being established with the customer, and where the output portion corresponds to a type of communication link established.

* * * * *